(12) United States Patent
Jensen et al.

(10) Patent No.: US 11,465,944 B2
(45) Date of Patent: Oct. 11, 2022

(54) METHOD OF APPLYING A NOX DEGRADING COMPOSITION ON A CONCRETE ELEMENT

(71) Applicant: VALINGE PHOTOCATALYTIC AB, Viken (SE)

(72) Inventors: Henrik Jensen, Olstykke (DK); Karsten Felsvang, Allerod (DK); Michael Humle, Vallensbaek Strand (DK)

(73) Assignee: Photocat A/S, Rosklide (DK)

( * ) Notice: Subject to any disclaimer, the term of this patent is extended or adjusted under 35 U.S.C. 154(b) by 67 days.

(21) Appl. No.: 14/783,493

(22) PCT Filed: Apr. 11, 2014

(86) PCT No.: PCT/SE2014/050454
§ 371 (c)(1),
(2) Date: Oct. 9, 2015

(87) PCT Pub. No.: WO2014/168576
PCT Pub. Date: Oct. 16, 2014

(65) Prior Publication Data
US 2016/0075606 A1 Mar. 17, 2016

(30) Foreign Application Priority Data
Apr. 12, 2013 (SE) .................... 1350470-9

(51) Int. Cl.
*C04B 41/50* (2006.01)
*C04B 41/00* (2006.01)
(Continued)

(52) U.S. Cl.
CPC .......... *C04B 41/5041* (2013.01); *B01D 53/88* (2013.01); *B01J 21/063* (2013.01);
(Continued)

(58) Field of Classification Search
CPC ............. C04B 41/5041; C04B 41/009; C04B 41/4578; C04B 41/65; B01D 53/88; B01J 21/063; B01J 35/004
See application file for complete search history.

(56) References Cited

U.S. PATENT DOCUMENTS 5,560,773 A * 10/1996 Gimvang .............. C04B 41/009
106/14.11
6,409,821 B1 6/2002 Cassar et al.
(Continued)

FOREIGN PATENT DOCUMENTS

CN 101 254 406 A 9/2008
CN 101591195 A * 12/2009
(Continued)

OTHER PUBLICATIONS

Hassan et al. (Methods for the Application of Titanium Dioxide Coatings to Concrete Pavement, Int J Pavement Res Technol. 5(1)2012, 12-20).*
(Continued)

*Primary Examiner* — Colin W. Slifka
*Assistant Examiner* — Michael Forrest
(74) *Attorney, Agent, or Firm* — Buchanan Ingersoll & Rooney P.C.

(57) ABSTRACT

A method of applying a NOx degrading composition on a concrete element, including providing a concrete element having a surface, and applying a composition including photocatalytic titanium dioxide particles dispersed in a continuous phase on the surface of said concrete element. Also, a concrete element having NOx degrading properties. Also, a concrete element having photocatalytic titanium dioxide particles dispersed thereon.

26 Claims, 2 Drawing Sheets

(51) Int. Cl.
  *C04B 41/65*  (2006.01)
  *B01J 35/00*  (2006.01)
  *B01D 53/88*  (2006.01)
  *B01J 21/06*  (2006.01)
  *C04B 41/45*  (2006.01)
  *C04B 111/00*  (2006.01)

(52) U.S. Cl.
  CPC .......... *B01J 35/004* (2013.01); *C04B 41/009* (2013.01); *C04B 41/4578* (2013.01); *C04B 41/65* (2013.01); *B01D 2255/20707* (2013.01); *B01D 2255/802* (2013.01); *B01D 2257/302* (2013.01); *B01D 2257/404* (2013.01); *B01D 2257/708* (2013.01); *B01D 2259/4591* (2013.01); *C04B 2111/00827* (2013.01)

(56) References Cited

U.S. PATENT DOCUMENTS

| | | |
|---|---|---|
| 6,454,489 B1 | 9/2002 | Murata et al. |
| 9,375,750 B2 | 6/2016 | Reenberg et al. |
| 9,573,126 B2 | 2/2017 | Humle et al. |
| 9,945,075 B2 | 4/2018 | Persson et al. |
| 2009/0317624 A1 | 12/2009 | Yoshioka et al. |
| 2010/0297434 A1 | 11/2010 | Iversen et al. |
| 2011/0189471 A1 | 8/2011 | Ziegler et al. |
| 2012/0064787 A1 | 3/2012 | Brummerstedt Iversen et al. |
| 2013/0011684 A1 | 1/2013 | Jensen et al. |
| 2014/0178694 A1 | 6/2014 | Reenberg et al. |
| 2015/0083319 A1 | 3/2015 | Persson et al. |
| 2015/0102258 A1 | 4/2015 | Humle et al. |
| 2015/0343486 A1 | 12/2015 | Jensen et al. |
| 2017/0297056 A1 | 10/2017 | Ziegler et al. |

FOREIGN PATENT DOCUMENTS

| | | |
|---|---|---|
| CN | 101903309 A | 12/2010 |
| CN | 102 247 755 A | 11/2011 |
| EP | 0 919 667 A1 | 6/1999 |
| EP | 0919667 | 6/1999 |
| EP | 1997860 A1 | 12/2008 |
| JP | 2002338375 A * | 11/2002 |
| JP | 2005-015307 A | 1/2005 |
| JP | 2006-102567 A | 4/2006 |
| KR | 2010-0113971 A | 10/2010 |
| KR | 2010 0113971 A | 10/2010 |
| WO | WO 01/00541 A1 | 1/2001 |
| WO | WO 2007/097284 A1 | 8/2007 |
| WO | WO 2009/052585 A1 | 4/2009 |

OTHER PUBLICATIONS

Official Action issued in CN 201480020340.9, dated Oct. 10, 2016, Intellectual Property Office of the Peoples Republic of China, CN 18 pages (including English-language translation).

Shi, Hui, "Efficiency Analysis of Nano-TiO2 Photocatalytic Purification of $NO_x$ in Automobile Exhaust", *Engineering Technology II*, Oct. 15, 2009, 8 pages [cover page, pp. 29, 44 and 45 (in Chinese), pp. 29, 44 and 45 (English-language translation)], CN.

International Search Report (PCT/ISA/210) dated Aug. 5, 2014, by the Swedish Patent Office as the International Searching Authority for International Application No. PCT/SE2014/050454.

Written Opinion (PCT/ISA/237) dated Aug. 5, 2014, by the Swedish Patent Office as the International Searching Authority for International Application No. PCT/SE2014/050454.

Extended European Search Report dated Nov. 25, 2016 in EP 14 78 3398.2, European Patent Office, Munich, DE, 7 pages.

* cited by examiner

METHOD OF APPLYING A NOX DEGRADING COMPOSITION ON A CONCRETE ELEMENT

FIELD OF THE INVENTION

The present invention relates to a method of applying a NOx degrading composition on a concrete element, and such a concrete element having NOx degrading properties.

TECHNICAL BACKGROUND

Photocatalytic compounds such as TiO2 can be used to produce air purifying building materials. A promising idea is to incorporate TiO2 in cementitious building materials for example TiO2 air purifying pavements. Photocatalytic air purifying pavements are interesting as traffic volume is increasing in big cities, which add up to the emission of pollutants in the cities. Furthermore, the numerous high rise buildings create street canyons, which make it difficult to disperse the pollutants generated by a high concentration of vehicles at the street level. This results in high level of pollutant at ground level and there is a need to remove these pollutants from the atmosphere as they pose a threat to the human health in the big cities. Using a photocatalytic pavement to help improving the air quality in cities is promising as TiO2 incorporated in building materials can remove significantly portions of NOx, SO2 and VOC (Volatile Organic Compound) pollutants when situated close to the source of pollutant.

Air pollution caused by road traffic and industries is a major problem in big cities.

For example U.S. Pat. No. 6,409,821 and EP 0 919 667 disclose methods of producing photocatalytic pavement by mixing TiO2 powder with a cementitous mixture including a hydraulic binder and applying this mixture as a double layer paving block technique. However, this technique is suffering under the fact that the products have a low activity and a high material consumption due to the incorporation of TiO2 in the cementitious matrix. Furthermore, the double layer technique suffers from the fact that incorporating the TiO2 particles in the cementitious composition affects the overall properties of the cementitious products such as strength. Also in the double layer technique the fact that the loading of TiO2 is high and that micron sized TiO2 is used, the visual appearance of the product with TiO2 is different from the product without TiO2.

SUMMARY

It is an object of the present invention to provide an improvement over the above described techniques and known art.

A further object of at least certain embodiments of the present invention is to provide improved air pollution reducing capacity, especially improved NOx degrading capacity.

A further object of at least certain embodiments of the present invention is to reduce the amount of TiO2 required to obtain a certain level of air pollution reduction, especially NOx degrading capacity.

A further object of at least certain embodiments of the present invention is to provide NOx degrading properties on an existing concrete component.

A further object of at least certain embodiments of the present invention is to improve properties of a concrete element and reduce the influence of humidity and weathering of the concrete element.

A further object of at least certain embodiments of the present invention is to improve the NOx degrading properties over the lifetime of the concrete element by reducing the effect of humidity and weathering and thereby maintaining a high NOx degrading property.

At least some of these and other objects and advantages that will be apparent from the description have been achieved by a method of applying a NOx degrading composition on a concrete element, comprising providing a concrete element having a surface, applying a composition comprising photocatalytic titanium dioxide particles dispersed in a continuous phase on the surface of said concrete element.

Preferably, said titanium dioxide particles are applied on the surface of the concrete element in an amount of 5 g/m2, preferably 3 g/m2 or less, more preferably 2 g/m2 or less, most preferably 1 g/m2 or less.

The concrete element may be a concrete paving element or a concrete building element.

An advantage of applying photocatalytic titanium dioxide particles is that the concrete element obtains NOx degrading properties. Thereby, buildings, pavements and roads formed of concrete elements can reduce the level of pollutants such as NOx in the air, and improve the environment in towns and cities.

An advantage of the method is that the composition may be applied on the concrete element in connection with manufacturing of the concrete element, and on already existing installed concrete elements. Thereby, existing roads, pavements, buildings etc. may be provided with a composition giving the concrete element NOx degrading properties.

A further advantage is that the NOx degrading performance is improved compared to known art. The amount of titanium dioxide particles may be decreased while a maintained or improved NOx degrading performance is obtained.

In one embodiment, the composition is free from any binder. The composition may be free from any hydraulic or cementitious binder. Thereby, the composition is easy to apply on both an existing concrete element and in connection with production. The composition does not substantially impact the visual impression of the concrete element. The composition does not substantially impair properties of the concrete element, such as essentially maintaining the strength of the concrete element. In one embodiment, the composition may improve properties such as strength of the concrete element.

In one embodiment, the composition further comprises a silica compound, preferably an alkali silicate such as sodium silicate, lithium silicate and/or potassium silicate. Alkali silicates, also known as waterglass, improve surface properties of a concrete element. Waterglass fills pores in the concrete element, and impregnates and seals the surface of the concrete element. Waterglass reduces the water absorption of the concrete element. Thereby, the influence of humidity and weathering of the concrete element may be decreased simultaneously as the concrete element obtains NOx degrading properties. By including a silica compound in the composition, both NOx degrading properties and resistance of the concrete element are improved. Further, the NOx degrading properties may be maintained over longer time since the silica compound reduces the effect of humidity and weathering on the photocatalytic particles applied on the concrete element. In one embodiment, the silica compound may comprise silica, silanes and/or siloxanes for obtaining similar properties as described above.

The continuous phase may be a solvent, preferably water. By using a liquid solvent, the composition may convey the photocatalytic titanium dioxide particles into the concrete element. The porous structure of the concrete element may facilitate conveying the composition into the interior of the concrete element. Thereby, the photocatalytic particles are present not only on the surface. When the concrete element is subjected to wear, the NOx degrading properties are maintained since the photocatalytic titanium dioxide particles are present in the concrete element also at a distance from the surface.

The solvent may constitute at least 50 wt % of the composition, preferably at least 70 wt % of the composition, more preferably at least 90% wt of the composition.

The density of the composition equals or is less than 1.5 g/ml, preferably equals or is less than 1.3 g/ml.

The viscosity of the composition may be less than 15 cP, preferably less than 10 cP. The viscosity of the composition may be about 1-10 cP such as about 5 cP.

The composition may further comprise a wetting agent as an additive.

The composition may consist of the solvent, the photocatalytic titanium dioxide particles, and additives such as wetting agents, dispersion agents, pH stabilisation agents. Preferably, the composition comprises no cementitious or hydraulic binder.

The composition may comprise 0.1-5 wt % photocatalytic titanium dioxide particles and 0.001-5 wt % additives, the remaining part being the solvent.

The composition may comprise 90-99 wt % solvent, 0.1-5 wt % photocatalytic titanium dioxide particles, and 0.001-5 wt % additives.

The composition is preferably transparent. Thus, the composition does not substantially influence on the appearance of the concrete element.

The composition may at least partially permeate into a porous structure of the concrete element.

The concrete element may be essentially cured. The composition may be applied on an existing, installed concrete element or in connection with manufacture of the concrete element.

The concrete element may be essentially uncured. The composition may be applied during manufacture before curing or before being fully cured.

An upper surface of the concrete element may obtain hydrophilic properties after application of the composition.

A NOx degrading performance, as measured in accordance with ISO 22197-1 test procedure, may equal or exceed 10%, preferably equal or exceed 15%, more preferably equal or exceed 20%, most preferably equal or exceed 30%, at said surface of the concrete component. An improved NOx degrading performance may be obtained by the method compared to known solutions.

5 g/m2 or less of titanium dioxide particles may be applied on said surface, preferably 3 g/m2 or less, more preferably 2 g/m2 or less, most preferably 1 g/m2 or less of titanium dioxide particles. By using the method, it is possible to decrease the amount of photocatalytic titanium dioxide particles applied while maintaining or improving the NOx degrading performance.

The composition may be applied in an amount that equals or exceeds 100 ml/m2, preferably equals or exceeds 150 ml/m2, more preferably equals or exceeds 200 ml/m2. It has been shown in the examples that by increasing the amount of composition applied, the amount of photocatalytic titanium dioxide particles applied per unit area can be reduced with maintained or improved NOx degrading performance.

The concentration of the titanium dioxide particles in the composition may equal or be less than 2.5 wt %, preferably equal or be less than 1.5 wt %, more preferably equal or be less than 1.0 wt %. The concentration of the titanium dioxide particles in the composition may equal or be less than 5 wt %. By using the method, it is possible to decrease the concentration of photocatalytic titanium dioxide particles in the composition while maintaining or improving the NOx degrading performance.

The NOx degrading performance equals or exceeds 2.5%, preferably equals or exceeds 5%, more preferably equals or exceeds 10%, at a depth of 0.5 mm below said surface of the concrete component. Since the solvent conveys the photocatalytic titanium dioxide particles into the concrete element, the NOx degrading properties are obtained not only at the surface of the concrete element but also at a distance from the surface. When the concrete element is subjected to wear, the concrete element still provides a NOx degrading performance.

The photocatalytic titanium dioxide particles may have a primary size less than 50 nm, preferably less than 30 nm, more preferably less than 20 nm. By using nano-sized titanium dioxide particles, the visual impression of the concrete element remains essentially the same. In one embodiment, the photocatalytic titanium dioxide particles may have a primary size less than 100 nm.

The titanium dioxide particles may be in anatase phase.

According to a second aspect of the invention, a concrete element having NO degrading properties is provided. The concrete element comprises photocatalytic titanium dioxide particles in an amount equal or less than 5 g/m2, preferably equal or less than 3 g/m2, and wherein a NO degrading performance equals or exceeds 5%, preferably equals or exceeds 10%, more preferably equals or exceeds 15%, most preferably equals or exceeds 20% such as 30%, at a surface of the concrete element.

The concrete element having NOx degrading properties incorporates all the advantages of the inventive method, which previously has been discussed, whereby the previous discussion is applicable also for the concrete component.

The concrete element may be a concrete paving element or a concrete building element.

The photocatalytic titanium dioxide particles may be provided in an upper portion of the concrete element.

The upper portion may be extending from an upper surface of the concrete element to a depth of 1.5 mm, preferably a depth of 2.0 mm, more preferably a depth of 2.5 mm.

The titanium dioxide particles may be heterogeneously distributed in the concrete element.

The NO degrading performance may be exceeding 2.5%, preferably exceeding 5%, more preferably 10%, at a depth of 0.5 mm below an upper surface of said concrete element.

The photocatalytic titanium dioxide particles may have a primary size less than 50 nm, preferably less than 30 nm, preferably less than 20 nm.

The photocatalytic titanium dioxide particles may be in anatase phase.

An upper surface of the concrete element may be hydrophilic.

According to a third aspect of the invention, a method of applying a NOx degrading composition on a concrete element is provided. The method comprises providing a concrete element having a surface, and applying a composition comprising photocatalytic titanium dioxide particles dispersed in a continuous phase on the surface of said concrete element, wherein the composition is substantially free from any binder.

According to a fourth aspect of the invention, a method of applying a NOx degrading composition on a concrete element is provided. The method comprises providing a concrete element having a surface, and applying a composition on the surface of said concrete element, the composition comprising photocatalytic titanium dioxide particles dispersed in a continuous phase and at least one silica compound dispersed in a continuous phase.

Said at least one silica compound is mixed with the titanium dioxide continuous phase to create a stabile dispersion that reduces the water absorption of the concrete element and thereby maintaining a NOx degrading properties of the concrete element over time, since the concrete element being more resistant to humidity and weathering.

Preferably, the silicate compound comprises an alkali silicate such as sodium silicate, lithium silicate and/or potassium silicate. Alkali silicates, also known as waterglass, improve surface properties of a concrete element. Waterglass fills pores in the concrete element, and impregnates and seals the surface of the concrete element. Waterglass reduces the water absorption of the concrete element. Thereby, the influence of humidity and weathering of the concrete element may be decreased simultaneously as the concrete element obtains NOx degrading properties. By including a silica compound in the composition, both NOx degrading properties and resistance of the concrete element are improved. Further, the NOx degrading properties may be maintained over longer time since the silica compound reduces the effect of humidity and weathering on the photocatalytic particles applied on the concrete element. In one embodiment, the silica compound may comprise silica, silanes and/or siloxanes for obtaining similar properties as described above.

The continuous phase may be a solvent, preferably water.

The concrete element may be essentially cured.

The concrete element may be essentially uncured.

A NOx degrading performance, as measured in accordance with ISO 22197-1 test procedure, may equal or exceed 10%, preferably equal or exceed 15%, more preferably equal or exceed 20%, most preferably equal or exceed 30%, at said surface of the concrete component.

15 g/m2 or less of titanium dioxide particles may be applied on said surface, preferably 10 g/m2 or less, and more preferably 5 g/m2 or less of titanium dioxide particles.

The composition may be applied in an amount that equals or exceeds 100 ml/m2, preferably equals or exceeds 150 ml/m2, more preferably equals or exceeds 200 ml/m2.

The concentration of the titanium dioxide particles in the composition may equal or be less than 15 wt %, preferably equal or be less than 10 wt %, more preferably equal or be less than 5 wt %.

BRIEF DESCRIPTION OF THE DRAWINGS

The present invention will by way of example be described in more detail with reference to the appended schematic drawings, which show embodiments of the present invention.

DETAILED DESCRIPTION

Figure 1:
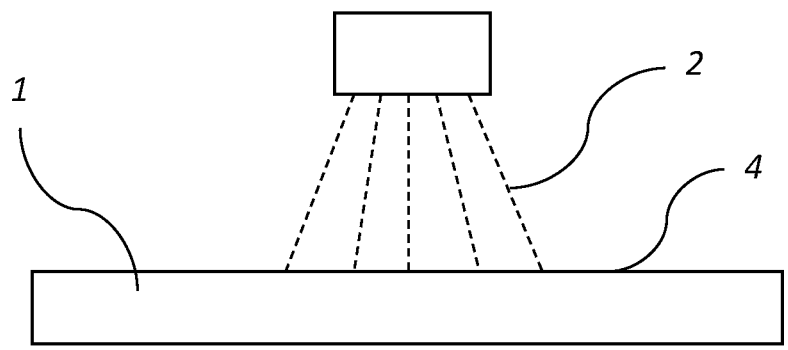
FIG. 1 illustrates a method of applying a composition comprising photocatalytic titanium dioxide on a concrete element.

A method of providing a concrete element 1 having NOx degrading properties will now be described with reference to FIGS. 1 and 2. The concrete element 1 may for example be a concrete paving element or a concrete building element. The concrete building element may be a concrete element for construction of buildings, bridges, roads etc. The concrete paving element 1 may be a concrete paving component such as a paving tile, a paving stone, or a surface formed of plurality of paving tiles or paving stones. The concrete paving element may be a garden paving element, a pavement paving element, a road paving element, a parking paving element, a cycleway paving element, a recreating grounds paving element, etc.

The concrete element 1 comprises cement as a hydraulic binder, aggregate and water.

The concrete element 1 may comprise a single layer of concrete material or more than one layer of concrete material. The concrete element 1 may have any shape, for example circular, rectangular etc. The concrete element 1 may be a continuous concrete surface, for example moulded to form a pavement or a road.

A composition 2 comprising photocatalytic titanium dioxide particles 3 dispersed in a continuous phase, also called a photocatalytic dispersion hereafter, is applied on a surface 4 of the concrete element 1. The titanium dioxide particles 3 are photocatalytic nanoparticles. The titanium dioxide particles 3 are preferably in anatase phase. The composition 2 is preferably liquid.

The titanium dioxide particles 3 may have a primary size in the range between 5 to 250 nm, preferably between 5 to 100 nm, more preferably between 5 to 50 nm, most preferably between 5 and 30 nm. The titanium dioxide particles 3 may have an agglomerate size of <300 nm<200 nm<100 nm, such as <80 nm preferably an aggregate size of <60 nm such as of <40 nm and even more preferably an aggregate <30 nm such as <20 nm.

In an embodiment, the photocatalytic particles 3 may be doped with non-metals and/or metals. The $TiO_2$ particles may be doped with non-metals and/or elements such as but not limited to the list of C, N, F, S, Mo, V, W, Cu, Ag, Au, Pt, Pd, Fe, Co, La, Eu, $WO_2$, and PdO or a combination thereof. The photocatalytic particles may be visible light sensitive and/or UV sensitive photocatalytic particles.

The continuous phase is a solvent, preferably water. The solvent may constitute at least about 50 wt % of the composition, preferably at least about 70 wt % of the composition, more preferably at least about 90% wt of the composition. The composition 2 may further comprise additives such as pH stabilisation agents, dispersion agents, wetting agents. Preferably, the composition comprises a wetting agent.

In one embodiment, the composition 2 consists of the solvent, the photocatalytic titanium dioxide particles and at least one additive. Preferably, the composition is a water-based dispersion. The composition is free from cementitious or hydraulic binder. Preferably, the composition does not cure but dries.

The concentration of the photocatalytic titanium dioxide particles 3 in the composition may be less than about 5 wt %, preferably less than about 2.5 wt %, more preferably less than about 1.5 wt %, most preferably less than about 1.0 wt %.

As an example, the composition 2 may comprise 0.1-5% by weight photocatalytic titanium dioxide particles. The composition may comprise 90-99% by weight solvent. The composition may comprise 0.001-5% by weight of additives such as pH stabilisation agents, dispersion agents, wetting agents. In one embodiment, the composition comprises 0.1-1% by weight of a wetting agent.

In one embodiment, the composition comprises at least one silica compound. Preferably, the silicate compound comprises an alkali silicate (also known as waterglass) such as sodium silicate, lithium silicate and/or potassium silicate. In one embodiment, the silica compound may comprise silica, silanes and/or siloxanes. Said at least one silica compound is mixed with the titanium dioxide continuous phase to create a stabile dispersion that reduces the water absorption of the concrete element. The ratio between the amount of silica compound such as alkali silicate in relation to the amount of titanium dioxide in the composition may be in the range of about 1:1 to 15:1, such as about 1:1, 3:1, 6:1, 9:1 or 15:1. In this embodiment, 15 g/m2 or less of titanium dioxide particles may be applied, preferably 10 g/m2 or less, and more preferably 5 g/m2 or less of titanium dioxide particles. The composition may be applied in an amount that equals or exceeds 100 ml/m2, preferably equals or exceeds 150 ml/m2, more preferably equals or exceeds 200 ml/m2. The concentration of the titanium dioxide particles in the composition may equal or be less than 15 wt %, preferably equal or be less than 10 wt %, more preferably equal or be less than 5 wt %.

The density of the composition may be less than about 1.5 g/ml, preferably less than about 1.3 g/ml.

The photocatalytic dispersion 2 may be applied on the concrete element 1 before or after the concrete element 1 has cured. The photocatalytic dispersion 2 may be applied during production of the concrete element 1 when the concrete element 1 is essentially uncured. Alternatively, the photocatalytic dispersion 2 is applied when the concrete element is essentially cured. The photocatalytic dispersion 2 may be applied after production when the concrete element is essentially cured. The photocatalytic dispersion 2 may also be applied when the concrete element is installed. Thereby, the photocatalytic dispersion can be applied on an existing pavement, road, garden path, square, patio, building, bridge etc.

The photocatalytic dispersion 2 may be applied by spraying, which is shown in FIG. 1, or by roller coating etc. Aerosol spraying may be used, for example by using air nozzles or hydraulic nozzles, for applying the photocatalytic dispersion.

The amount of the photocatalytic dispersion 2 applied may be about 50-500 ml/m$^2$. Preferably, the amount of the photocatalytic dispersion applied is exceeding about 100 ml/m$^2$, preferably exceeding about 150 ml/m$^2$, more preferably exceeding about 200 ml/m$^2$.

The loading of photocatalytic titanium dioxide particles 3 applied may be about 0.5-10 g/m$^2$, preferably about 0.5-5 g/m$^2$. Preferably, the loading of photocatalytic titanium dioxide particles 3 applied equals or is less than about 10 g/m$^2$, less than about 5 g/m$^2$, less than about 3 g/m$^2$, less than about 2 g/m$^2$, less than about 1 g/m$^2$.

As an example, the amount of the photocatalytic dispersion 2 applied is exceeding about 100 ml/m$^2$, preferably exceeding about 150 ml/m$^2$, more preferably exceeding about 200 ml/m$^2$, and the loading of photocatalytic titanium dioxide particles applied is less than about 5 g/m$^2$, preferably less than about 3 g/m$^2$.

The photocatalytic dispersion 2 is applied on an upper surface 4 of the concrete element 1. The concrete material of the element 1 is porous, thereby allowing the photocatalytic dispersion to at least partially penetrate into the concrete element 1. The concentration of the photocatalytic dispersion 2 is decreasing with the distance form the upper surface 4 of the concrete element, which is shown in FIG. 2. The NOx reducing capacity is decreasing with the distance from the upper surface 4 of the concrete element.

After the photocatalytic dispersion 2 has been applied to the upper surface 4 of the concrete element 1, the upper surface 4 of the concrete element 1 obtains hydrophilic properties. The contact angle with water is preferably less than 90°, more preferably less than 60°, and most preferably less than 30°.

Figure 2:
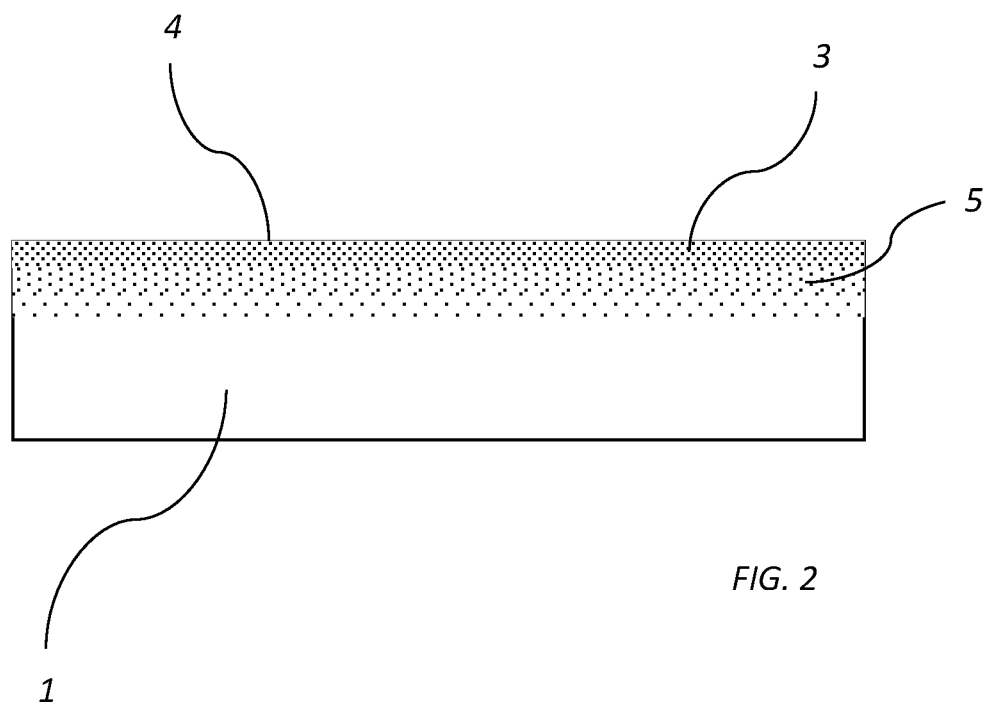
FIG. 2 schematically illustrates a concrete element comprising photocatalytic titanium dioxide.

When the photocatalytic dispersion 2 has been applied, the titanium dioxide particles 3 are heterogeneously distributed in the concrete element 1 in a direction perpendicular to the surface 4 of the concrete element 1 as shown in FIG. 2. The titanium dioxide particles 3 are provided in an upper portion 5 of the concrete element 1. The upper portion 5 including the titanium dioxide particles 3 may be extending from the upper surface 4 of the concrete component 1 to a depth of 1.5 mm, preferably 2.0 mm, more preferably 2.5 mm. The upper portion 5 including the titanium dioxide particles 3 may be extending over the entire surface 4 of the concrete element 1.

The concrete element 1 may thus comprise photocatalytic titanium dioxide particles 3 in an amount of about 0.5-10 g/m$^2$, preferably about 0.5-5 g/m$^2$. Preferably, the amount of photocatalytic titanium dioxide particles 3 in the concrete element 1 is less than about 10 g/m$^2$, is less than about 5 g/m$^2$, is less than about 3 g/m$^2$, is less than about 2 g/m$^2$, is less than about 1 g/m$^2$.

The NO degrading performance as measured according to ISO 22197-1 at the upper surface 4 of the concrete element 1 may be exceeding about 5%, about 10%, about 15%, about 20%, about 30%.

As an example, the concrete element 1 may thus comprise photocatalytic titanium dioxide particles 3 in an amount of about 0.5-5 g/m$^2$, and the NO degrading performance as measured according to ISO 22197-1 at the upper surface 4 of the concrete element 1 may be exceeding about 15%, preferably exceeding about 20%, more preferably exceeding about 30%.

When the concrete element 1 has been worn, the concrete element 1 still offers a NO$_x$ degrading performance. At a distance of 0.5 mm from the upper surface 4 of the concrete element 1, the NO degrading performance as measured according to ISO 22197-1 may be exceeding about 2.5%, preferably exceeding 5 about %, more preferably exceeding about 10%.

The visual impression of the concrete element 1 remains essentially the same after application of the photocatalytic dispersion 2. The photocatalytic dispersion 2 does not essentially change the properties such as strength of the concrete element. In certain embodiments, such as when an alkali silicate is included in the composition, the concrete element may be reinforced by the applied composition.

The NO degrading performance defined above is measured according to ISO 22197-1. Several parameters such as light intensity, unit area etc. differs from one test method to another, thereby results from tests using different test methods are not comparable.

It is contemplated that there are numerous modifications of the embodiments described herein, which are still within the scope of the invention as defined by the appended claims.

EXAMPLES

Example 1

Five commercial concrete pavement blocks, 50×50 cm², were used to test the photocatalytic performance of a spray applied concrete block. 55 g/m² of photocatalytic dispersion (PD) was applied on each concrete block with an airbrush. The photocatalytic dispersion was a 5 wt % waterbased $TiO_2$ dispersion stabilized to pH 10-11 with ammonia. The average particle size in the dispersions (measured by Volume with Nanotrac NPA 252) was measured to 17 nm. The five concrete blocks were sprayed and left for ambient drying for 24 hours. After 24 hrs., the photocatalytic pavement blocks were cut into 5×10 cm² pieces and analysed according to ISO 22197-1.

ISO 22197-1 Test Procedure:

The NOx degrading performance of the sample was tested according to ISO 22197-1. The initial concentration of NO was 1.0 ppm and the flow of NO gas over the sample was 3 l/min. The concentrations of NO, $NO_2$ and NOx was analysed with a Horiba APNA NOx analyzer model 370. The test cell was purchased from an accredited institute. The light intensity was 1.0 mW/cm² UVA measured with a PMA 2110 UVA detector and the relative humidity was kept constant at 45%±5%. The sample sizes in the test were 49×99 mm².

TABLE 1

NO degradation results after ISO 22197-1.

|  | 50 × 50 Pavement Block |
|---|---|
| % NO degradation after 24 hrs. amb. Drying | 15.8% |
| % NO degradation after 0.5 mm wear abrasion | 0.7% |

Example 2

A 50×50 cm2 grey pavement stone (IBF Module Pavement Stone 50×50 manufactured by IBF, Denmark) was cut into 5×10 cm2 pieces and two samples of each treatment, PB1 to PB3, were prepared according to the parameters listed in Table 2. A photocatalytic dispersion PD as described above with reference to Example 1 was used. 0.3 wt % wetting agent was added to the photocatalytic dispersion PD. The photocatalytic dispersion PD was applied on the samples and then ambient dried for 24 hours before the NOx performance was evaluated according to ISO 22197-1. The samples were tested in five steps:

Step 1: NO degradation tested according to ISO 22197-1 after application of Photocatalytic dispersion and 24 hrs. ambient drying.

Step 2: The samples tested in Step 1 were tested against out-washing by rain water by drop wise applying 900 ml de-ionized water to the 5×10 cm² sample (appr. 30 min treatment). The sample was then ambient surface dried and then dried at 105° C. for 24 hours. Hereafter, the samples were tested for NO degradation according to ISO 22197-1.

Step 3: The samples tested in Step 2 were worn down by 0.5 mm and then the NO degradation was tested according to ISO 22197-1.

Step 4: The samples tested in Step 3 were worn down by 1.0 mm and then the NO degradation was tested according to ISO 22197-1.

Step 5: The samples tested in Step 4 were tested against out-washing by rain water by drop wise applying 900 ml de-ionized water to the 5×10 cm² sample (appr. 30 min treatment). The sample was then ambient surface dried and then dried at 105° C. for 24 hours. Hereafter, the samples were tested for NO degradation according to ISO 22197-1.

The results for the pavement block samples treated with Step 1 to Step 5 are shown in Table 2.

TABLE 2

NO degradation results after ISO 22197-1.

|  | PB1 | PB2 | PB3 |
|---|---|---|---|
| Wt % $TiO_2$ [%] | 0.5 | 2.5 | 0.5 |
| Amount [ml/m²] | 200 | 200 | 500 |
| Loading of $TiO_2$ [g/m²] | 1.0 | 5.0 | 2.5 |
| % NO Degr. Step 1 | 37.0% | 52.2% | 44.2% |
| % NO Degr. Step 2 | 34.8% | 53.3% | 44.1% |
| % NO Degr. Step 3 | 10.5% | 30.8% | 17.7% |
| % NO Degr. Step 4 | 7.4% | 22.2% | 11.0% |
| % NO Degr. Step 5 | 6.4% | 19.1% | 10.1% |

The data in Table 2 show that it is possible to have both a high NOx degrading activity but also to have a NOx degrading activity more than 1 mm down in the pavement stone with $TiO_2$ loadings of 1 to 5 g/m² and by applying 200-500 ml/m² of the photocatalytic dispersion.

Example 3

IBF Modulserie 30×10×7.5 cm (manufactured by IBF, Denmark) was used to test the effect of applying different concentrations of a photocatalytic dispersion PD as described above with reference to Example 1 having different concentration of $TiO_2$. 3 samples were made for each concentration and the average NOx degradation performances are listed in Table 3. The amount of photocatalytic dispersion was applied with a pipette. After application the samples went through Step 1 and Step 2 as described above in Example 2, following by testing the NOx degradation properties after the sample was worn a certain amount of mm down as listed in Table 3.

TABLE 3

NO degradation results after ISO 22197-1.

|  | Stone1 | Stone2 | Stone3 |
|---|---|---|---|
| Wt % $TiO_2$ [%] | 0.5 | 1.5 | 2.5 |
| Amount [ml/m²] | 200 | 200 | 200 |
| Loading of $TiO_2$ [g/m²] | 1.0 | 3.0 | 5.0 |
| % NO Degr. Step 1 | 29% | 16% | 16% |
| % NO Degr. Step 2 | 58% | 57% | 54% |
| % NO Degr. 0.5 mm | 12% | 14% | 14% |
| % NO Degr. 1.0 mm | 9% | 10% | 13% |
| % NO Degr. 1.4 mm | not measured | 10% | not measured |
| % NO Degr. 1.8 mm | not measured | not measured | 7% |

The results in Table 3 show that the NOx degrading activity of the photocatalytic pavement stones depends to a higher extent on the total amount of fluid applied per m2 of the pavement stones than on the overall loading (g $TiO_2/m^2$) of $TiO_2$ on the pavement stones.

Example 4

IBF Modulserie 30×10×7.5 cm (manufactured by IBF, Denmark) was used to test the effect of the size in dispersion of the applied $TiO_2$. Furthermore, the effect of amount and the application method was also tested. One series of experiments (Stone4) was applied as Stone1 explained in Example 3; however, instead of 17 nm $TiO_2$ particles, $TiO_2$ particles with an average size in dispersion of 73 nm were used where the average particle size in the dispersion was measured by volume with Nanotrac NPA 252. For Stone 5 and Stone 6 photocatalytic dispersion PD was used in a 5 wt % concentration.

TABLE 4

NO degradation results after ISO 22197-1.

|  | Stone1 | Stone4 | Stone5 | Stone6 |
|---|---|---|---|---|
| Wt % $TiO_2$ [%] | 0.5 | 0.5 | 5.0 | 5.0 |
| Size in Dispersion [nm] | 17.5 | 73 | 17.5 | 17.5 |
| Amount [ml/m$^2$] | 200 | 200 | 55 | 55 |
| Loading of $TiO_2$ [g/m$^2$] | 1.0 | 1.0 | 2.7 | 2.7 |
| Application Type | Pipette | Pipette | Pipette | Airbrush |
| % NO Degr. Step 1 | 29% | 9% | 11% | 9% |
| % NO Degr. Step 2 | 58% | 10% | 50% | 37% |
| % NO Degr. 0.5 mm | 12% | 2% | 3% | 5% |
| % NO Degr. 1.0 mm | 9% | 1% | 2% | 2% |

The results in Table 4 show that by comparing Stone 1 and Stone 4 it is obvious that the overall performance and especially the activity down in the matrix of the stone is depended on the particle size. Comparing an average particle size of approximate 17 nm with an average particle size of 73 nm it shows 5-6 times higher activity for the 17 nm Stone (Stone 1) both as initial NOx degradation activity as well as 0.5 nm and 1.0 mm down in the stone matrix.

Example 5

IBF Modulserie 30×10×7.5 cm concrete stone (manufactured by IBF, Denmark) was used immediately after production and before the stones have cured, which will in the following will be defined as a wet stone. The photocatalytic dispersion PD is used and applied with an automatic hydraulic nozzle set-up.

TABLE 5

NO degradation results after ISO 22197-1.

|  | Stone7 | Stone8 | Stone9 | Stone10-REF |
|---|---|---|---|---|
| Wt % $TiO_2$ [%] | 0.5 | 0.5 | 0.5 | 0.0 |
| Amount [ml/m$^2$] | 100 | 150 | 200 | 0.0 |
| Loading of $TiO_2$ [g/m$^2$] | 0.5 | 0.75 | 1.0 | 0.0 |
| Application Type Application | wet-in-wet hydraulic nozzles | wet-in-wet hydraulic nozzles | wet-in-wet hydraulic nozzles | REF |
| % NO Degr. Step 1 | 16% | 16% | 19% | 0.3% |
| % NO Degr. Step 2 | 26% | 27% | 29% | 0.2% |
| % NO Degr. 0.5 mm | 3% | 5% | 7% | 0.1% |
| % NO Degr. 1.0 mm | 2% | 3% | 3% | 0.1% |

Table 5 shows that by applying the photocatalytic dispersion to an uncured wet concrete stone a high NOx degrading activity is measurable both initially and down in the matrix.

Example 6

Real Life Test

IBF Modulserie 30×10×10 cm (manufactured by IBF, Denmark) was used to test the real life effect of produced photocatalytic concrete stones, in the following referred to as NOx-OFF stones. The amount of photocatalytic dispersion was applied with an automatic spraying set-up. 150 g/m$^2$ of photocatalytic dispersion was applied on the stones with a hydraulic nozzle set-up. The photocatalytic dispersion was a 0.5 wt % water based $TiO_2$ dispersion stabilized to pH 10-11 with ammonia. The average particle size in the dispersions (measured by Volume with Nanotrac NPA 252) was measured to approximate. 15 nm. 250 m$^2$ of NOx-OFF stones were produced and dried before installing it on a parking lot. The NOx degrading properties of the NOx-OFF stones before installation were tested according to ISO 22197-1 as explained in Example 1.

TABLE 6

NO degradation results after ISO 22197-1.

|  | Average of 6 NOx-OFF Stones |
|---|---|
| Wt % $TiO_2$ [%] | 0.5 |
| Amount [ml/m$^2$] | 150 |
| Loading of $TiO_2$ [g/m$^2$] | 0.75 |
| % NO Degr. Step 1 | 10% |
| % NO Degr. Step 2 | 23% |

Figure 3:
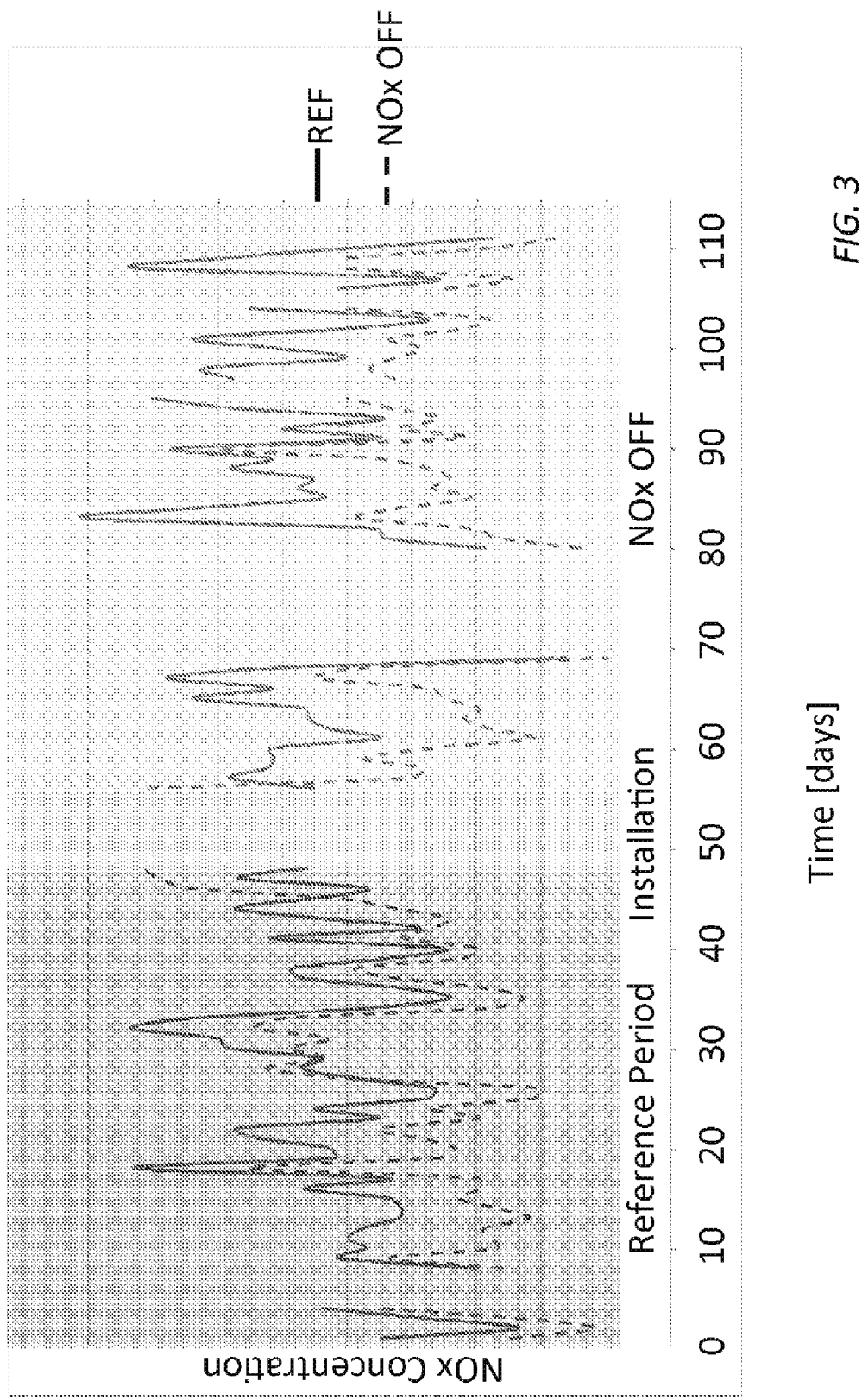
FIG. 3 illustrates NOx concentration over time.

The NOx-OFF stones were installed on a heavy duty traffic parking lot. The location was chosen so that next to the NOx-OFF stones was an equally sized reference area with conventional, non-photocatalytic, concrete stones. Furthermore, the chosen location was a payment car park so every car entering the car park on the NOx-OFF area was also to leave the car park on the reference area. Before installing the NOx-OFF stones the NOx level was measured on both areas for 41 days to be able to compare the air cleaning performance of the NOx-OFF stones. The NOx level was measured on both areas with a Eco Physics NOx analyzer with a multiplexing function measuring the NO, $NO_2$ and NOx values each 30 sec. After the NOx-OFF stones were installed the NOx level was measured for a period of 43 days. Comparing the reference measuring period with the period after installing the NOx-OFF stones it can be concluded that the NOx level was reduced by 13% overall on the NOx-OFF area, the NOx data are shown in FIG. 3. Analyzing the data from 10 am to 8 pm a reduction in the NOx levels of up to 24% could be observed.

The real life data for NOx-OFF concrete stones clearly shows that the high NOx degrading activities characterized in the lab by the ISO 22197-1 test procedure can also be determined in real life. By installing NOx-OFF stones in real life it was in Example 6 shown that the overall level of NOx on a heavy duty traffic parking lot could be reduced overall by 13%.

Example 7

IBF Modulserie (manufactured by IBF, Denmark) cut into the dimensions 10×5 cm was used to test the effect of applying different ratios of waterglass comprising alkali silicates with different concentrations of a photocatalytic dispersion being a waterbased TiO$_2$ dispersion. Four samples were made and for each mixture of alkali silicate and photocatalytic dispersion the initial activity was compared to the activity after 260, 426, and 583 hours in accelerated weathering following EN 1297:2004. The hours in accelerated weathering are estimated to correspond to approximately 10, 18, and 24 months in real life conditions. The concentration and the average NOx degradation performances are listed in Table 7. The amount of photocatalytic dispersion including alkali silicate was applied with a pipette. The NOx degradation properties of the samples are listed in Table 7.

TABLE 7

NO degradation results after ISO 22197-1.

|  | StoneA | StoneB | StoneC | StoneD |
|---|---|---|---|---|
| Wt % TiO$_2$ [%] | 15 | 7.5 | 5 | 1.9 |
| Wt % Alkali Silicate [%] | 15 | 20 | 22.5 | 26.7 |
| Amount [ml/m$^2$] | 200 | 200 | 200 | 200 |
| % NO Degr. Initial | 37% | 20% | 8% | 1% |
| % NO Degr. 260 hr (EN1297) | 45% | 13% | 5% | 8% |
| % NO Degr. 426 hr (EN1297) | 35% | 13% | 4% | 6% |
| % NO Degr. 583 hr (EN1297) | 54% | 22% | 7% | 10% |

The data in Table 7 show that when applying a photocatalytic dispersion including alkali silicate the photocatalytic activity is still high after 583 hours in accelerated weathering or what corresponds to approximately 2 years in outdoor conditions. For Stone A the activity has increased after 583 hours in EN 1297:2004 and for Stone D the activity is ten times higher than the initial activity.

Example 8

IBF Modulserie (manufactured by IBF, Denmark) cut into the dimensions 10×5 cm was used to test the effect of applying a photocatalytic dispersion including waterglass comprising alkali silicates and the consequence of water weathering on the sample and the photocatalytic activity right after water weathering. 4 samples were made and for each mixture of alkali silicate and photocatalytic dispersion comprising a waterbased TiO$_2$ dispersion the initial activity was compared to the activity after drop test—Step 1 and Step 2 in Example 2 above, however the samples are tested directly after drop test and 1 hour ambient drying.

TABLE 8

NO degradation results after ISO 22197-1.

|  | StoneA | StoneD | StoneE | StoneF |
|---|---|---|---|---|
| Wt % TiO$_2$ [%] | 15 | 1.9 | 2.9 | 1.4 |
| Wt % Alkali Silicate [%] | 15 | 26.7 | 13.3 | 6.7 |
| Amount [ml/m$^2$] | 200 | 200 | 200 | 200 |
| % NO Degr. Initial | 45% | 11% | 5% | 5% |
| % NO Degr. Directly after drop test | 52% | 8% | 5% | 5% |

The data in Table 8 show that when applying a photocatalytic dispersion including alkali silicate, the photocatalytic activity is maintained after drop test even without additional forced drying.

Example 9

IBF Modulserie (manufactured by IBF, Denmark) cut in the dimensions 10×5×1.5 cm was used to test the effect of applying a photocatalytic dispersion including waterglass comprising alkali silicates and TiO$_2$ on water absorption compared to water absorption of a concrete sample without alkali silicate. The surface water absorption of StoneE from Example 8 and a reference concrete stone was tested. The StoneE and the reference stone were inserted with the surface pointing downwards in a container with 5 mm of de-ionized water. The weight of StoneE and of the reference stone were measured before being inserted in the de-ionized water and after being placed in the container with deionized water for 4 hours. The surface of the reference stone had absorbed 2.6% water of its total weight and the surface of Stone E had absorbed only 1.5% water of its total weight. The water absorption experiment shows that the photocatalytic dispersion including alkali silicate improved the resistance towards surface absorption of water.

The invention claimed is:

1. A method of applying a NOx degrading composition on a concrete element, comprising
    providing a concrete element having a surface, and
    applying a composition comprising photocatalytic titanium dioxide particles dispersed in a continuous phase on the surface of said concrete element in an amount that equals or exceeds 100 ml/m$^2$,
    wherein the composition further comprises a silica compound,
    wherein the ratio of the silica compound to titanium dioxide particles is between 1:1 to 15:1 wt % in the composition,
    wherein the continuous phase is water, and
    wherein said titanium dioxide particles are applied on the surface of the concrete element in an amount of 3 g/m$^2$ or less.

2. A method according to claim 1, wherein a NOx degrading performance as measured in accordance with ISO 22197-1 test procedure equals or exceeds 10% at said surface of the concrete component.

3. A method according to claim 1, wherein the concentration of said titanium dioxide particles in said composition equals or is less than 2.5 wt %.

4. A method according to claim 1, wherein the composition at least partially permeates into a porous structure of the concrete element.

5. A method according to claim 1, wherein the water constitutes at least 50 wt % of the composition.

6. A method according to claim 1, wherein the composition is free from any binder.

7. A method according to claim 1, wherein said composition consists of the water, the photocatalytic titanium dioxide particles, a silica compound, and at least one additive.

8. A method according to claim 1, wherein said composition comprises 90-99 wt % of the water, 0.1-5 wt % of photocatalytic titanium dioxide particles, and 0.001-5 wt % of additives.

9. A method according to claim 1, wherein a density of the composition equals or is less than 1.5 g/ml.

10. A method according to claim 1, wherein said concrete element is essentially cured.

11. A method according to claim 1, wherein said concrete element is essentially uncured.

12. A method according to claim 1, wherein the upper surface of the concrete element obtains hydrophilic properties after application of the composition.

13. A method according to claim 1, wherein the NOx degrading performance equals or exceeds 2.5% at a depth of 0.5 mm below said surface of the concrete component.

14. A method according to claim 1, wherein the photocatalytic titanium dioxide particles have a primary size less than 50 nm.

15. A method according to claim 1, wherein the titanium dioxide particles are in anatase phase.

16. A method according to claim 1, wherein the concrete element is a concrete paving element or a concrete building element.

17. A method according to claim 1, wherein the silica compound comprises an alkali silicate.

18. A concrete element having NOx degrading properties, comprising photocatalytic titanium dioxide particles in an amount equal or less than 3 g/m$^2$, an alkali silicate, wherein the ratio of the alkali silicate to titanium dioxide particles is between 1:1 to 15:1 wt % in the composition, and wherein a NOx degrading performance as measured in accordance with ISO 22197-1 test procedure equals or exceeds 5% at a surface of the concrete element.

19. A concrete element according to claim 18, wherein the photocatalytic titanium dioxide particles are provided in an upper portion of said concrete element.

20. A concrete element according to claim 19, wherein said upper portion is extending from an upper surface of the concrete element to a depth of 1.5 mm.

21. A concrete element according to claim 18, wherein the titanium dioxide particles are heterogeneously distributed in the concrete element.

22. A concrete element according to claim 18, wherein the NOx degrading performance equals or exceeds 2.5% at a depth of 0.5 mm below an upper surface of said concrete element.

23. A concrete element according to claim 18, wherein the photocatalytic titanium dioxide particles have a primary size less than 50 nm.

24. A concrete element according to claim 18, wherein the titanium dioxide particles are in anatase phase.

25. A concrete element according to claim 18, wherein an upper surface of the concrete element is hydrophilic.

26. A concrete element according to claim 18, wherein the concrete element is a concrete paving element or a concrete building element.

* * * * *